United States Patent

[11] 3,627,891

[72] Inventor Patrick R. Driscoll
     Spotswood, N.J.
[21] Appl. No. 867,355
[22] Filed Oct. 17, 1969
[45] Patented Dec. 14, 1971
[73] Assignee Mobil Oil Corporation

[54] USE OF PYRIMIDYLTHIURONIUM SALTS AS FUNGICIDES
8 Claims, No Drawings

[52] U.S. Cl. .................................................. 424/251,
                                                       260/256.5 R
[51] Int. Cl. .................................................. A01n 9/00,
                                                       A01n 9/22
[50] Field of Search .................................... 424/251;
                                                       260/256.5 R

[56] References Cited
OTHER REFERENCES

Boarland et al., J. C. S., 1951, pp. 1218–1221.
Polonovski et al., Chem. Abst., 45, 2008i, 1951.

Primary Examiner—Jerome D. Goldberg
Assistant Examiner—Allen J. Robinson
Attorneys—Oswald G. Hayes, Andrew L. Gaboriault and Mitchell G. Condos ABSTRACT: Certain pyrimidylthiuronium halide salts substituted in the 2-position with the thiuronium halide substituent form a new class of fungicides. They are highly effective as soil fungicides against Fusarium oxysporium, Pythium debaryanum, Rhizoctonia solani, and Sclerotium rolfsii.

USE OF PYRIMIDYLTHIURONIUM SALTS AS FUNGICIDES

BACKGROUND OF THE INVENTION

Field of the Invention

This invention is directed to the novel use of pyrimidylthiuronium halide salts as fungicides. It is more particularly concerned with the use of substituted pyrimidyl rings with a nitro substituent at the 5-position and a thiuronium halide substituent at the 2-position.

Description of the Prior Art

It is known to those skilled in the art that thiopyrimidines may be synthesized by hydrolysis of their thiuronium salts (M. Polonovski and H. Schmitt, Chem. Abstr., 45, 2008i (1950)). Also, monosubstituted pyrimidines and the action of thiourea on chloropyrimidines is known (M.P.V. Boarland and J.F.W. McOmid, J.C.S., 1951, 1218). No references known to the inventor disclose the use of pyrimidylthiuronium salts as fungicides.

SUMMARY OF THE INVENTION

This invention provides a method for combatting fungi which comprises contacting the fungi with at least one compound having the formula:

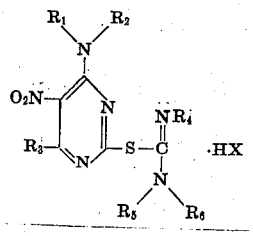

wherein X is halogen, and $R_1$, $R_2$, $R_3$, $R_4$, $R_5$ and $R_6$ may be the same or different and are selected from the group consisting of hydrogen, $C_1$-$C_4$ alkyl, $C_3$-$C_6$ cycloalkyl, alkoxyalkyl, alkylthioalkyl, aryl, and substituted aryl.

DESCRIPTION OF SPECIFIC EMBODIMENTS

As will be noted from the formula the compounds used in this invention are substituted pyrimidyl rings with a nitro substituent at the 5-position and a thiuronium halide substituent at the 2-position. Nonlimiting examples of the compounds used in this invention include:

(4-ethylamino-6-methyl-5-nitro-2-pyrimidyl)methylthiuronium chloride;
[4-(2-methoxyethylamino)-6-methyl-5-nitro-2-pyrimidyl] thiuronium chloride;
[4-(2-methoxyethylamino)-5-nitro-2-pyrimidyl] thiuronium chloride;
(4-propylamino-6-ethyl-5-nitro-2-pyrimidyl)ethylthiuronium chloride;
(4-cyclopentylamino-6-methyl-5-nitro-2-pyrimidyl) methylthiuronium chloride;
(4-phenylamino-6-methyl-5-nitro-2-pyrimidyl) methylthiuronium chloride;
(4-methylamino-6-cyclohexyl-5-nitro-2-pyrimidyl) ethylthiuronium chloride;
(4-methylamino-6-phenyl-5-nitro-2-pyrimidyl) ethylthiuronium chloride;
(4-ethylamino-6-methyl-5-nitro-2-pyrimidyl) cyclopentylthiuronium chloride;
(4-ethylamino-6-methyl-5-nitro-2-pyrimidyl) phenylthiuronium chloride;
[4-(2-methoxyethylamino)-6-ethyl-5-nitro-2-pyrimidyl] ethylthiuronium chloride;
[4-(2-methoxyethylamino)-6-phenyl-5-nitro-2-pyrimidyl] methylthiuronium chloride;
[4-ethylamino-6-(2-methoxyethyl)-5-nitro-2-pyrimidyl] ethylthiuronium chloride;
(4-ethylamino-6-methyl-5-nitro-2-pyrimidyl) methylthiuronium fluoride;
[4-(2-methoxyethylamino)-6-methyl-5-nitro-2-pyrimidyl] thiuronium fluoride;
[4-(2-methoxyethylamino)-5-nitro-2-pyrimidyl] thiuronium fluoride;
(4-propylamino-6-ethyl-5-nitro-2-pyrimidyl) ethylthiuronium fluoride;
(4-cyclopentylamino-6-methyl-5-nitro-2-pyrimidyl) methylthiuronium fluoride;
(4-phenylamino-6-methyl-5-nitro-2-pyrimidyl) methylthiuronium fluoride;
(4-ethylamino-6-methyl-5-nitro-2-pyrimidyl) cyclopentylthiuronium fluoride;
(4-ethylamino-6-methyl-5-nitro-2-pyrimidyl) phenylthiuronium fluoride;
[4-(2-methoxyethylamino)-6-ethyl-5-nitro-2-pyrimidyl] ethylthiuronium fluoride;
(4-ethylamino-6-methyl-5-nitro-2-pyrimidyl) methylthiuronium bromide;
[4-(2-methoxyethylamino)-6-methyl-5-nitro-2-pyrimidyl] thiuronium bromide; and
[4-(2-methoxyethylamino)-5-nitro-2-pyrimidyl] thiuronium bromide.

The compounds used in this invention are readily prepared by the general procedure: an appropriate halogenated substituted 5-nitropyrimidine is mixed with an appropriate thiourea and an alcohol, such as absolute ethanol. The mixture is heated to an elevated temperature for a period of time, then cooled. The solid pyrimidylthiuronium halide product is then slurried with water and collected by filtration. The following examples demonstrate the typical procedure.

EXAMPLE 1

(4-Ethylamino-6-Methyl-5-Nitro-2-Pyrimidyl) Methylthiuronium Chloride 2.5 g. of 2-chloro-4-ethylamino-6-methyl-5-nitropyrimidine was dissolved in 30 ml. of absolute ethanol. 1.0 g. of methylthiuorea was added and the mixture was heated to 75° C. for 1 hour, cooled and concentrated under reduced pressure, slurried with water, filtered, and then dried in a vacuum oven at 55° C. for 16 hours to yield 2.4 g. of yellow solid product which had a decomposition point of 120° C.

EXAMPLE 2

[4-(2-Methoxyethylamino)-6-Methyl-5-Nitro-2-pyrimidyl] Thiuronium Chloride 4.7 g. of 2-chloro-4-(2-methoxyethylamino)-6-methyl-5-nitropyrimidine was dissolved in 30 ml. of absolute ethanol and reacted with 1.3 g. of thiourea as in the above example to yield 3.5 g. of yellow solid product which had a decomposition point of 176° C.

EXAMPLE 3

[4-(2-Methoxyethylamino)-5-Nitro-2-Pyrimidyl] Thiuronium Chloride 3.6 g. of 2-chloro-4-(2-methoxyethylamino)-5-nitropyrimidine was dissolved in 30 ml. of absolute ethanol and reacted with 1.2 g. of thiourea as in the above examples to yield 2.8 g. or red solid product which had a decomposition point of 150°–152° C.

The compounds of the examples were subjected to the following fungicidal tests. The results are set forth in the table following the test descriptions.

SOIL FUNGICIDE TESTING METHOD

Four representative soil fungi, *Fusarium oxysporium*, *Pythium debaryanum*, *Rhizoctonia solani* and *Sclerotium rolfsii*, are maintained on potato dextrose agar in 20×150 mm. test tubes. Inoculum for the test is increased in a 1,000 ml. Erlenmeyer flask on a ¼ corn meal, ¾ sand mixture (by volume). The medium is saturated with water and sterilized by autoclaving at 15 pounds pressure for 20 minutes on 2 successive days. The medium is inoculated by transferring, aseptically, a small portion of mycelium from the test tube cultures 14 days prior to using for inoculum.

An inoculated medium for each of the four soil organisms is prepared as follows.

A 14-day-old 1,000 ml. flask of corn meal, sand inoculum is used to inoculate 20 10 oz. cups of sterile soil by blending the inoculum and sterile soil for 10 minutes in the cement mixer.

The inoculated medium is then placed in a 10 oz. wax-treated cold drink cup (20 cups of each organism) and treated as follows. One hundred and fifty mg. quantity of each candidate fungicide is weighed on the analytical balance and formulated using 10 ml. of acetone and 190 ml. of $H_2O$. If the compound is insoluble in acetone or water, 1.1 g. of Continental Clay, 0.1 g. of Marasperse N and 2 g. of Petro-BP is added and the mixture ground in the Waring blender for 3 minutes. Continental Clay is kaolinite clay, Marasperse N is sodium ligno sulfonate and Petro-BP is linear alkylnaphthalene sodium sulfonate. A 50 ml. quantity of each chemical formulation is used to drench 1 cup inoculated with each of the 4 fungal organisms. Immediately after the cups are drenched, they are placed in polyethylene bags (1 cup per bag) and held at 70° F. for 14 days.

After 10 days, each cup is examined for the presence of fungal growth and each compound rated for percent inhibition of fungal growth.

TABLE.—FUNGICIDAL ACTIVITY OF PYRIMIDYLTHIURONIUM SALTS*

| Concentration of compound, p.p.m. | Percent inhibition of fungal growth of— | | | |
|---|---|---|---|---|
| | Fusarium Oxysporium | Pythium debaryanum | Rhizoctonia Solani | Sclerotium rolfsii |
| Compound of Example— | | | | |
| 1 { 50 | 100 | 100 | 100 | 100 |
| 25 | 100 | 100 | 90 | 90 |
| 2 { 50 | 100 | 0 | 0 | 100 |
| 25 | 90 | | | 100 |
| 3 { 50 | 0 | 0 | 100 | 0 |
| 25 | | | 0 | |

*Fungicidal activity is measured in percent effectiveness.

From the data in the table, it will be noted that the pyrimidylthiuronium halide salts used in this invention have a broad range of soil fungicidal activity. The compound of example 1 is 100 percent effective as an inhibitor of fungal growth of *Fusarium oxysporium* and *Pythium debaryanum* and 90 percent effective against *Rhizoctonia Solani* and *Sclerotium rolfsii* at only 25 p.p.m. fungicidal concentration. The compound of example 2 is 100 percent effective against *Sclerotium rolfsii* and 90 percent effective against *Fusarium oxysporium* at only 25 p.p.m.

The compounds may be used in this invention in various ways to achieve fungicidal action. They can be applied as dusts, as liquid sprays, or as gas-propelled sprays, and can contain, in addition to a carrier, additives such as emulsifying agents, wetting agents, binding agents, gases compressed to the liquid state, odorants, stabilizers, and the like. A wide variety of liquid and solid carriers can be used in the fungicidal compositions. Nonlimiting examples of liquid carriers include water; organic solvents, such as alcohols, ketones, amides, and esters; mineral oils, such as kerosene, light oils, medium oils; and vegetable oils, such as cottonseed oil. Nonlimiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

In order to achieve a broader spectrum of control, it is within the contemplation of this invention to include two more pyrimidylthiuronium halide salt derivatives in the fungicidal composition. The amount of the derivatives used in the fungicidal compositions will vary rather widely. It depends to some extent upon the type of composition in which the material is being used, the nature of the condition to be controlled, and the method of application. In the ultimate fungicidal composition, as applied in the field, fungicide concentrations as low as 0.0001 weight-percent of the total composition can be used. IN general, compositions, as applied, containing about 0.0005 weight-percent fungicide in either liquid or solid carrier, give good results. In some case, however, stronger dosages up to about 1 weight-percent may be required.

In practice, fungicidal compositions are usually prepared in the form of concentrates, which are diluted in the field to the concentration desired for application. For example, the concentrate can be a wettable powder containing large amounts of fungicide, a carrier (e.g., attapulgite or other clay), and wetting and dispersing agents. Such powders can be diluted prior to application by dispersing them in water to obtain a sprayable suspension containing the concentration of fungicide desired for application. Other concentrates can be solutions that can be later diluted, e.g., with kerosene. Thus, it is within the contemplation of this invention to provide fungicidal compositions containing up to about 80 percent, by weight of the composition, of fungicide. Accordingly, depending upon whether it is ready for application, or it is in the concentrated form, the contemplated fungicidal compositions contain between about 0.0001 percent and 80 percent, by weight, of the compositions of at least one fungicidal pyrimidylthiuronium salt derivative and a carrier, liquid or solid, as defined hereinbefore.

Although the present invention has been described with preferred embodiments, it is to be understood that modifications and variations may be resorted to, without departing from the spirit and scope of this invention, as those skilled in the art will readily understand.

What is claimed is:

1. A method for combatting fungi which comprises contacting the fungi with a fungicidally effective amount of a compound having the formula:

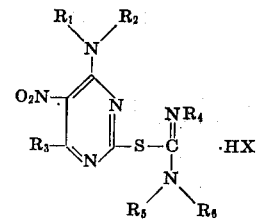

wherein X is fluorine, chlorine or bromine, and $R_1$, $R_2$, $R_3$, $R_4$, $R_5$ and $R_6$ may be the same or different and are selected from the group consisting of hydrogen, $C_1$–$C_4$ alkyl, $C_3$–$C_6$ cycloalkyl, methoxyethyl, and phenyl.

2. The method defined in claim 1, wherein said compound is (4-ethylamino-6-methyl-5-nitro-2-pyrimidyl) methylthiuronium chloride.

3. The method defined in claim 1, wherein said compound is [4-(2-methoxyethylamino)-6-methyl-5-nitro-2-pyrimidyl] thiuronium chloride.

4. The method defined in claim 1, wherein said compound is [4-(2-methoxyethylamino)-5-nitro-2-pyrimidyl] thiuronium chloride.

5. A fungicidal composition comprising a fungicidally effective amount of from about 0.0001 percent to about 80 percent, by weight of said composition, of a compound as defined in claim 1 and a solid carrier therefor.

6. A fungicidal composition comprising a fungicidally effective amount of from about 0.0001 percent to about 80 percent, by weight of said composition, of the compound as defined in claim 2 and a solid carrier therefor.

7. A fungicidal composition comprising a fungicidally effective amount of from about 0.0001 percent to about 80 percent, by weight of said composition, of the compound as defined in claim 3 and a solid carrier therefor.

8. A fungicidal composition comprising a fungicidally effective amount of from about 0.0001 percent to about 80 percent, by weight of said composition, of the compound as defined in claim 4 and a solid carrier therefor.

* * * * *